Figure 1:
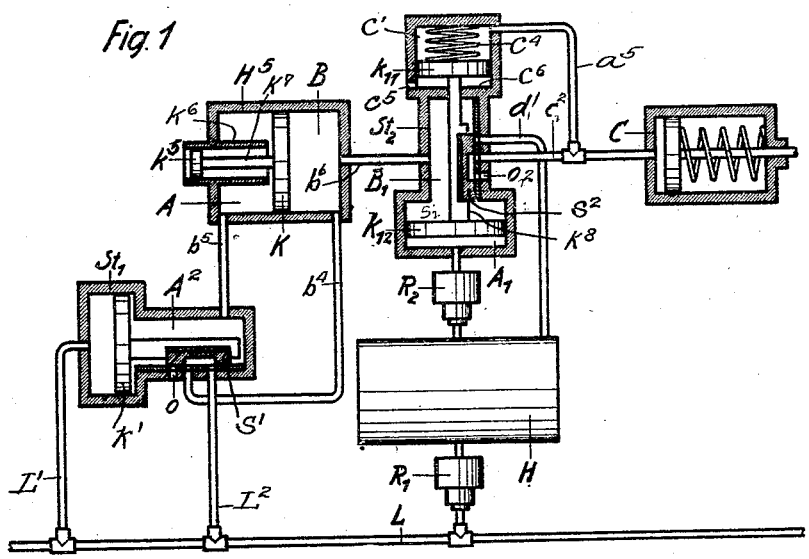

Aug. 12, 1930. W. HILDEBRAND 1,772,832
COMPRESSED AIR BRAKE
Filed Nov. 30, 1928 2 Sheets-Sheet 1

Aug. 12, 1930.  W. HILDEBRAND  1,772,832
COMPRESSED AIR BRAKE
Filed Nov. 30, 1928   2 Sheets-Sheet 2
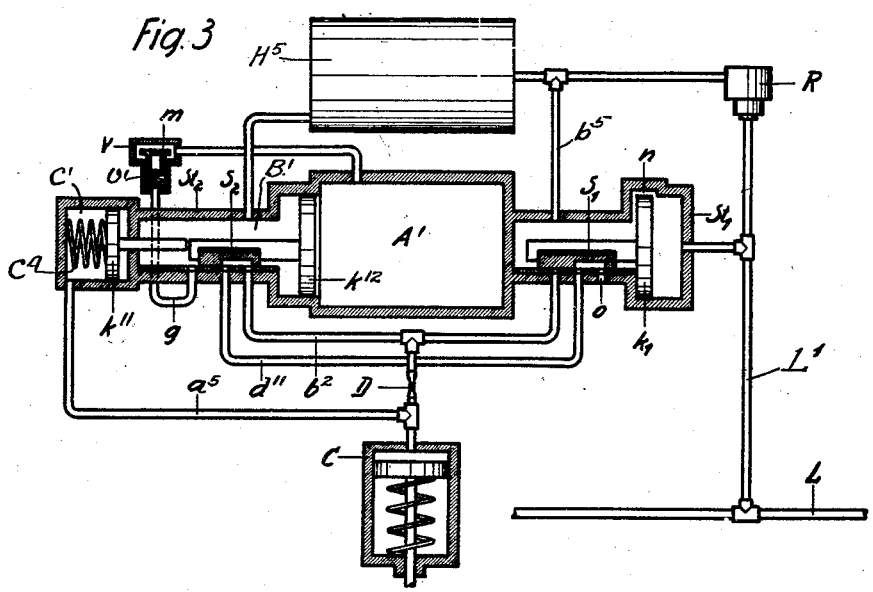
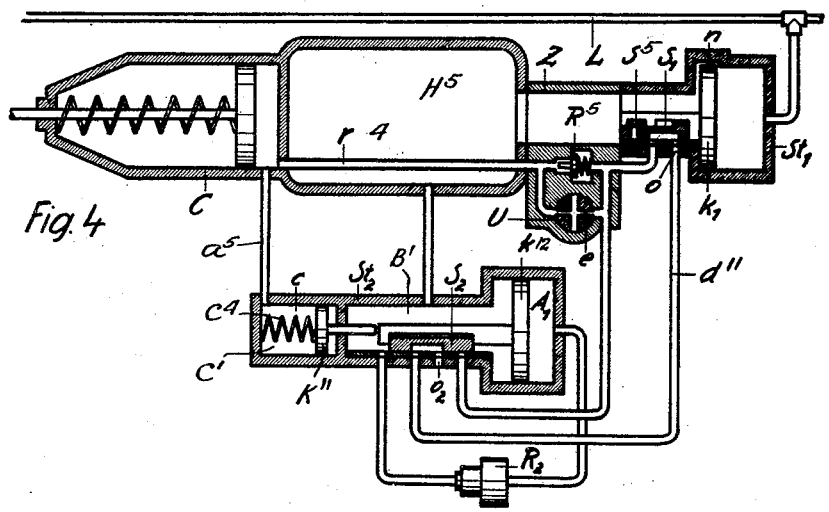

Patented Aug. 12, 1930

1,772,832

UNITED STATES PATENT OFFICE

WILHELM HILDEBRAND, OF BERLIN, GERMANY

COMPRESSED-AIR BRAKE

Application filed November 30, 1928, Serial No. 322,942, and in Germany November 1, 1927.

This invention relates to single chamber compressed air brakes, and its chief object is to produce a brake in which both the braking and releasing operations are completely graduated, and in which the pressure in the brake cylinder can be automatically maintained at the predetermined level even in the case of leakages occuring in the said cylinder.

Single-chamber compressed air brakes are already known, wherein the graduation of the releasing process is effected by means of a special device added to the usual braking installation. In these known brakes the additional effect of the special device is limited to the release of the air from the brake cylinder, and they do not present the possibility of an automatic replenishing in case of a fall in the brake cylinder pressure due to leakage in the cylinder.

In the case of control valves wherein the control of the pressure in the brake cylinder is effected by valves operated by means of the said pressure, the control members used are subjected on both sides to different pressures. The control members must therefore be at all times absolutely tight against any pressure difference. For such working conditions the known control pistons provided with a packing ring and easily displaceable are not suitable because the packing ring is not absolutely tight. With brakes of the above mentioned kind it has therefore been necessary to employ diaphragms, or, in case of long control paths, pistons packed with leather rings. Owing to the considerable friction of the packing rings, such pistons are not sensitive to small pressure differences, and the packing rings owing to their content of fat become stiff in winter, and may possibly freeze on to the cylinder walls. The requisite sensitiveness of the brakes is thus adversely affected to a considerable degree.

In the case of control pistons that are only temporarily exposed to pressure differences, and where an equalization of the pressures soon takes place, such a packing is not essential, consequently the known split packing ring is employed; this packing although not absolutely tight, does not prevent the control piston from being sensitive to pressure differences. Because of the leakage permitted by their easy working, however, such pistons are not suitable for control valves on brakes of known types where a fine graduation of the braking and release processes is required.

According to the present invention a primary control valve has an easily moving piston which is on the one side exposed to the train pipe pressure and on the other side to the pressure of a regulating air container, the filling and exhaustion of which container are governed by the said primary control valve, so that the piston of the said valve is only temporarily exposed to differences of pressure on opposite sides. The pressure conditions in the brake cylinder are governed by a secondary control valve influenced by three forces, namely, by the brake cylinder pressure and the continuous but variable pressure in the said container acting conjointly in the same direction, and by a third force acting in the opposite direction. The movements of the control members in this secondary control valve which effect the application and release of the brake are caused by alterations in the pressure of the regulating container, which pressure is dependent on the movements of the highly sensitive primary control valve in accordance with the variations of pressure in the train pipe. The operative members of this secondary control valve may comprise differential pistons, namely, a main piston connected with a slide and exposed on one side to the container pressure, and a separate piston exposed to brake cylinder pressure supporting the action of the container pressure on the main piston, this main piston being on its other side exposed to a pressure in the control chamber of the secondary valve opposing the two first mentioned forces.

In order that the said invention may be clearly understood and readily carried into effect the same will now be described more fully with reference to the accompanying diagrams illustrating four different constructional embodiments of the invention, Figures 1 to 4.

In the embodiment according to Figure 1 the train pipe L is connected by pipes $L^1$, $L^2$ with the interior of the casing of the primary control valve $St^1$. The primary control valve comprises a piston $k^1$ operatively connected with a hollow slide $S^1$, which slide normally covers an aperture $o$ opening to the atmosphere. The regulating air container $H^5$ is at one end connected by a pipe $b^5$ with the space $A^2$ behind the piston $k^1$, and is at its other end connected by a pipe $b^4$ with the interior of the primary control valve casing at a point adjacent to the mouth of the pipe $L^2$, the mouths of the pipes $b^4$ and $L^2$ both opening into the hollow of the slide $S^1$ when this slide is in the normal or release position as indicated in the drawing. In the regulating container $H^5$ is formed a sleeve $k^6$, in which can work a small piston $k^5$ on the rod $k^7$ of a piston K, the latter piston dividing the interior of the container $H^5$ into two chambers A and B, the capacities of these chambers A, B, being variable according to the movements of the piston K.

The secondary control valve $St^2$ comprises a central chamber $B^1$, a wider chamber $A^1$, and a compartment $c^1$ separated from the said central chamber by a partition $c^6$, this compartment $c^1$ having an aperture $c^5$ adjacent to the said partition opening to the atmosphere. On a piston rod $k^8$ are secured pistons $k^{11}$ and $k^{12}$ working respectively in the compartment $c^1$ and the chamber $A^1$, and a slide $S^2$ working in the central chamber $B^1$ is operatively connected with the said rod. A light spring $c^4$ pressing on the piston $k^{11}$ tends to keep the piston system in the position shown in the drawing. The space $B^1$ is in communication through a pipe $b^6$ with the space B in the container $H^5$. The usual auxiliary reservoir H, which is in communication with the train pipe L through a non-return valve $R^1$, is also in communication with the space $A^1$ through a non-return valve $R^2$, and a pipe $d^1$ leads from this reservoir H to an opening in the casing of the valve $St^2$ which is normally closed by the slide $S^2$. A pipe $c^2$ leading from the brake cylinder C opens into the casing of the valve $St^2$ adjacent to a hole $o^2$ which is an outlet to the atmosphere, and when the hollow part of the slide $S^2$ is in the position illustrated the brake cylinder can exhaust through the hole $o^2$. A branch pipe $a^5$ from this pipe $c^2$ opens into the compartment $c^1$.

The small counterpiston $k^5$ ensures that the pressure in the chamber A is in proportion to the loaded piston area greater than in the chamber B, except that equality of pressures may exist when the brake is fully applied. When filling and when completely releasing the brake the overflow of the compressed air from the chamber B which is filled by the train pipe L through the control valve $St^1$ to the chamber A, takes place around the sleeve of the piston K. The purpose of the arrangement of the differential piston K—$k^5$ in the regulating container is to facilitate a stepped or graduated release of the brake in the following manner:—If after an application of the brake the pressure in the train pipe L is somewhat increased, but not to the maximum pressure of 5 atmospheres, in order to reduce the braking effect without fully releasing the brake, the augmented train pipe pressure tends to press the control piston $k^1$ with its slide $S^1$ into the position of release as shown in Figure 1. Consequently compressed air passes through the pipes $L^2$ and $b^4$ to the chamber B and produces an increase of pressure therein, whereby the pistons K—$k^5$ are pressed towards the left hand side, but the effective surface of the back of the piston K being smaller than that of its front or right hand side to the extent of the cross sectional area of the rod $k^7$ and the piston $k^5$, in the condition of equipoise the air in the chambers A and $A^2$ is more strongly compressed than in the chamber B, that is to say, a higher pressure than prevails in the chambers A and $A^2$ than in the chamber B and train pipe L. This pressure causes the piston $k^1$ and slide $S^1$ to be forced somewhat towards the left hand side again, when the slide $S^1$ closes the mouth of the pipe $L^2$. If no further compressed air is admitted to the pipe L, the piston $k^1$ and slide $S^1$ remain standing in the position to which they have thus been moved; no more compressed air reaches the chamber B, and the control valve is in the partially released position.

In this manner the complete graduation of the pressure in chamber B is assured both in the increase and the decrease of the said pressure.

The space $B^1$ above the control piston $K^{12}$ is subjected to the pressure prevailing for the time being in the space B of the regulating container $H^5$. The spring $c^4$ conjointly with the pressure loading the upper side of the piston $K^{11}$ holds the slide valve $S^2$ of the control valve in that position in which, when the brake is released, the brake cylinder C is connected with the aperture $O^2$ leading to the atmosphere. In the space under the small piston $k^{11}$ air is released. This piston $k^{11}$ is not under pressure when the brake is released. When braking the compartment $c^1$ is filled at the same pressure as that existing in the brake cylinder C.

Every reduction of the pressure in the main pipe causes, because of the sensitiveness of the control piston in the control valve $St^1$, its displacement in the direction of the train pipe connection $L^1$; thereby the chamber B of the regulating air container $H^5$ is connected through O with the atmosphere. The pressure in chamber $B^1$ of the secondary control valve $St^2$ falls at the same rate as that in the chamber B. This pressure decrease in the chamber $B^1$ permits expansion of the air in the chamber A of the regulating air container. Should the pressure in the train pipe be reduced only a small amount and the pipe exhaust be then closed by moving the driver's brake valve into the closed position, the pressure in the space A soon falls below that in the pipe L, and the train pipe pressure moves the slide $S^1$ of the control valve $St^1$ into the closing position, in which the aperture O leading to the atmosphere is closed. Owing to the fact that the pressure in B and $B^1$ has fallen, a movement of the differential piston $k^{12}$, $k^{11}$ in the control valve $St^2$ occurs under the influence of the compressed air enclosed in the chamber $A^1$; if the capacity of this chamber $A^1$ is sufficient, the air therein only expands slightly. The said movement of the differential piston occurs in such a manner, that the slide valve $S^2$ closes the aperture $O^2$ leading to the atmosphere and connects the passages $d^1$ and $c^2$ and thus also the auxiliary air reservoir H, with the brake cylinder C. The increasing pressure developing in the latter acts on the small piston $k^{11}$ and moves it to close the pipe $d^1$ without bringing about a connection between $c^2$ and $O^2$ that would release the air from the brake cylinder, because of the resistance to such movement of the piston $k^{12}$ resulting from the compression of the air in the chamber $A^1$. Graduated further decrease of the pressure in the train pipe causes a gradually increasing braking effect; gradual increase of the pressure in the piping causes gradually decreased braking effect and finally a complete release of the brake.

Leakages of compressed air from the brake cylinder are automatically compensated in the following manner:—Assuming that on the application of the brake the pressure in the chamber B has fallen below the train pipe pressure owing to the escape of air through the pipe $b^4$ and the outlet O, until the restored train pipe pressure has pushed back the piston $k^1$ and slide $S^1$ to cut off the communication between $b^4$ and O, and that the brake cylinder pressure acting in the chamber $c^1$ on the piston $k^{11}$ has so displaced the slide $S^2$ that the connection between $c^2$ and $d^1$ is interrupted, now if air escapes from the brake cylinder through a leaky part thereof, the reduced pressure in the brake cylinder causes a reduction of pressure acting on the piston $k^{11}$. The pressure in the chamber $A^1$ is then able to lift the piston $k^{12}$ and slide $S^2$ sufficiently to reconnect $d^1$ and $c^2$, so that compressed air again flows from the auxiliary reservoir to the brake cylinder. The consequent rise of pressure in the brake cylinder is at the same time exerted on the piston $k^{11}$ which thus moves the slide $S^2$ to interrupt the connection between $d^1$ and $c^2$. Thus it will be seen that automatic compensation for losses of pressure in the brake cylinder is obtained.

Figure 2:
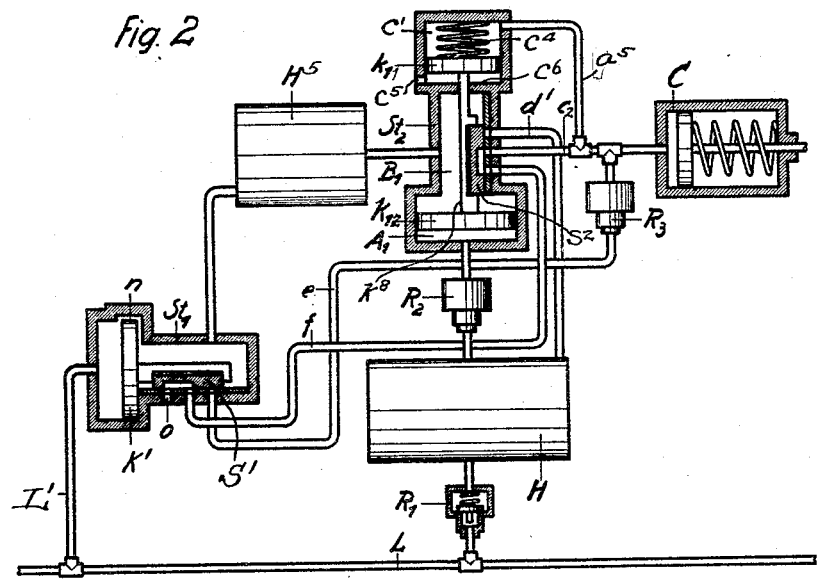

The example of construction represented in Figure 2 is simplified in comparison with that in Figure 1, insomuch as the regulating container $H^5$ is not divided, and a non-return or check valve $R^3$, opening towards the brake cylinder C, connects the said cylinder with the primary control valve $St^1$ when braking.

The air release of the brake cylinder has in this embodiment been allotted to the secondary and primary control valves. The filling groove $n$ in this embodiment provides for the filling of the container $H^5$.

If the braking operation is started by a reduction of the train pipe pressure, then the connection $f$—O is broken by the slide $S^1$ of the primary control valve $St^1$, and the connection between the regulating container $H^5$ and the pipes $e^1$ and $c^2$ is established. The brake cylinder C is therefore first of all supplied with compressed air from the regulating container $H^5$ through a non-return valve $R^3$. By reason of the reduction of the pressure in the container $H^5$ the pressure falls in the chamber $B^1$ of the secondary control valve $St^2$; the pressure prevailing in the control chamber $A^1$ displaces the control piston unit $k^{12}$, $k^{11}$ and thereby establishes the connection between the ducts $d^1$ and $c^2$ and also between the auxiliary air reservoir H and the brake cylinder C. If the pressure in $B^1$ falls below the pressure in the train pipe L when the exhaust of air in the train pipe L is interrupted by means of the driver's valve on the locomotive then the primary control valve $St^1$ is moved into the release position. The effect of the brake cylinder pressure on the small piston $k^{11}$ and thus also on the secondary control valve is the same as already described with regard to the example represented in Figure 1. A release of the brake cannot take place when the secondary control valve is moved into the release position, until the primary control valve, by itself taking up the release position, connects the duct $f$ with the exhaust opening O.

A further simplification of the brake is illustrated in Figure 3. In this arrangement only one container $H^5$ is provided, which not only serves as a regulating container for the secondary control valve, but also performs the function of an auxiliary air reservoir for the primary control valve and the brake cylinder. In this modification the control chamber $A^1$ of the secondary control valve $St^2$ is connected with the container $H^5$, and this connection is governed on the one hand by the secondary slide valve $S^2$ and on the other hand by a valve $v$, opening towards the control chamber $A^1$, which valve is provided with a hole or by-pass $m$ to render it sensitive. The differential piston $k^{11}$, $k^{12}$ that governs the motion of the slide valve $S^2$ in the secondary control valve is in this modification of the brake divided in such a manner, that the smaller piston $k^{11}$ which is influenced by the pressure of the brake cylinder, when braking, does not, in its normal position, act on the slide valve. The two control valves are arranged in such a manner, that each of them, when braking is going on, supplies the compressed air from the container $H^5$ to a pipe $b^2$ leading to the brake cylinder, in which pipe a throttled or constricted part D determining the rise of pressure in the brake cylinder is incorporated. The function of the valve $v$ is to maintain the pressure in the control chamber $A^1$ as far as possible at the same level. When equal pressures exist in the chambers $A^1$ and $H^5$ that is, when the brake is released, then the valve $v$ is kept in such a position by a light spring $v^1$ of only sufficient strength to carry its weight, that the small aperture $m$ in the cylindrical extension of the valve body effects the connection between $A^1$ and $B^1$. When the brake is applied and the pressure in the container $H^5$ falls, the valve $m$ is closed by the pressure in the chamber $A^1$.

When filling the spaces $A^1$ and $B^1$ (that is to say when the brake is released) the parts occupy the positions represented in Figure 3. The filling of the container $H^5$ is effected through the non-return valve R and the filling groove $n$. This filling groove determines at the same time the required non-sensitiveness of the control valve $St^1$ as regards possible leakages and the like.

If the control piston $k^1$ is displaced to the right during braking, in consequence of the drop of pressure in the train pipe, the opening O leading to the atmosphere is then closed, and simultaneously the mouth of the duct $b^2$ leading to the brake cylinder C is opened so that air flows from $H^5$ through $b^5$ and $b^2$ to the brake cylinder C. This causes a drop of the pressure in the container $H^5$; the pressure existing in the chamber $A^1$ cannot quickly equalize itself with the pressure in $H^5$, through the narrow hole $m$ of the valve $v$, and closes the said valve $v$. The controlling piston $k^{12}$ is moved to the left through the pressure of the chamber $A^1$; in doing this, it first of all traverses a distance which corresponds to the space or play between the rods of the pistons $k^{12}$ and $k^{11}$, and the slide $S_2$ thereby closes the mouth of the duct $g$ and opens the mouth of the duct $b^2$, so that compressed air flows to the brake cylinder from this side also. When the exhaust of train pipe air is interrupted by placing the driver's brake valve upon the locomotive in the brake release position, then the pressure in the regulating container $H^5$ again falls for the time being; if it has fallen below the train pipe pressure, then in the primary controlling valve the controlling slide $S^1$ is pushed back into the release position.

If the latter is the case, then no compressed air can escape from the brake cylinder, because the control slide $S_2$ holds the connection between $d^{11}$ and $b^2$ closed. When the pressure in the brake cylinder has reached $k^{11}$ somewhat to the right, so that the mouth of the duct $b^2$ is covered. Now, should the pressure in the brake cylinder fall owing to a leakage in the piston, then the pressure in the chamber $c^1$ will also fall, the pistons $k^{11}$ and $k^{12}$ move somewhat to the left and, through the duct $b^2$ thus exposed some compressed air will again flow into the cylinder until the original pressure has again been attained therein. Hence, also in this constructional form compressed air losses in the cylinder are automatically made good.

If it is intended to diminish the braking effect by a certain amount, then the slide $S^1$ of the primary control valve is pressed into the released position by means of the increase of the pressure in the train pipe. As a consequence the pressure in the container $H^5$ increases. The difference of pressure on the two sides of the piston $k^{12}$ becomes smaller, and the loading spring of the piston $k^{11}$ in conjunction with the brake cylinder pressure pushes the piston system to the right. The slide valve $S^2$ connects $b^2$ with $d^{11}$, and as $d^{11}$ is already connected with O, the brake cylinder air escapes to the atmosphere. The pressure acting upon the left side of the piston $k^{11}$ is therefore reduced; as the pressure in the container $H^5$ is not being increased to the amount corresponding to the complete release of the brake, the pressure prevailing in the chamber $A^1$ pushes the piston $k^{12}$ somewhat to the left so that the channel $b^2$ is closed.

When the brake is completely released the pressure in the container $H^5$ is increased to its maximum amount of 5 (five) atmospheres, whereby the channel $g$ is opened and the chamber $A^1$ is also filled with air up to the full pressure, should any leakage have occurred therein.

The embodiments described above differ considerably from the standard single chamber brakes of known types in regard to the arrangement of the primary control valve in relation to the brake cylinder and the auxiliary reservoir, and in that the graduating slide in the primary control valve is absent. If it is desired to convert the standard single chamber brake of known type, while retaining its essential character and the aforesaid arrangement of the parts in relation to each other, into a brake according to the principles of this invention, this can be effected by the arrangement represented diagrammatically in Figure 4. This figure illustrates, if the parts added by the conversion are for the moment neglected, the generally known arrangement of a single chamber brake, wherein the brake cylinder C is arranged on one side of the container $H^5$ acting both as auxiliary reservoir and regulating container, to the other side of which is fitted as a primary control valve the standard control valve $St^1$ with a bottom slide valve $S^1$, a graduating slide valve $S^5$, and a filling groove $n$. These parts are thus retained unaltered. It is only necessary to add for the conversion the secondary control valve $St^2$, an intermediate piece Z interpolated between the primary control valve $St^1$ and the container $H^5$, and the pipe $d^{11}$ connected with the exhaust opening $o$ which leads to the slide valve $S^2$ of the secondary control valve $St^2$, which pipe $d^{11}$ is in the release position connected by means of the slide valve $S^2$ with the additional exhaust opening $O^2$. A four way cock U is arranged in the intermediate piece Z and is provided with several passages of different diameters so as to enable the brake to be adapted for use with goods trains as well as passenger trains.

In order that the emptying of the brake cylinder, when the brake is being released, may be effected independently of the passage at the time in use in the cock U which determines the rise of the brake pressure, a duct $r^4$ controlled by the check valve $R^5$ is provided.

In the drawing the connection between the brake cylinder C and the chamber $c^1$ of the secondary control valve $St^2$ is represented as a pipe issuing from the brake cylinder, also the connection between the container $H^5$ and the compartment $c^1$ of the secondary control valve is immediately connected to the brake cylinder. This method of representation is adopted for the purpose of making the conditions easily comprehensible. For the purpose of avoiding any unnecessary alterations of the parts of the single chamber brake when transforming from the normal type, the chamber $c^1$ to be filled with air at the pressure of the brake cylinder, will be connected as near as possible to the connection of the pipe $r^4$ leading to the intermediate piece Z, and the connection between $B^1$ and $H^5$ will also be placed as close as possible to the corresponding opening in the intermediate piece Z.

Devices for causing the rapid transmission of the pressure drop in the pipe when the latter is opened by the driver's brake valve for the purpose of actuating the brake, and devices for throttling the flow of compressed air to the brake cylinder after the application of the brake shoes to the wheels, are preferably so arranged, that they are controlled by the primary control valve.

A minimum pressure valve acting in the manner known per se is if required arranged on the intermediate piece Z.

The working of a single chamber brake converted in the manner described in reference to Figure 4 corresponds with that of the brakes represented in Figures 1 to 3.

It will be understood that the air connections illustrated and described as pipes may in certain constructional embodiments be formed as ducts through solid portions of the structures.

What I claim and desire to secure by Letters Patent of the United States is:—

1. In a single chamber compressed air brake, a train pipe, a brake cylinder, a regulating container, a primary control valve having an easily moving piston highly sensitive to pressure variations, said primary control valve being directly connected with said pipe, connections from said primary control valve to said container adapted to effect the filling and exhaustion of said container in accordance with the movements of said piston, a secondary control valve having a control chamber, a piston reciprocable in said chamber, means operable by said piston to regulate the charging and discharging of the brake cylinder, connections from said container and from said cylinder to said secondary control valve whereby the pressures in said container and cylinder respectively are enabled to act in the same direction on the piston of said secondary control valve in opposition to a pressure in said control chamber.

2. In a single chamber compressed air brake, a train pipe, a brake cylinder, a regulating container, a primary control valve having an easily moving piston highly sensitive to pressure variations, said primary control valve being directly connected with said pipe, connections from said primary control valve to said container, said control valve in the release position opening communication between the train pipe and said container and in the brake position opening said container to the atmosphere, a secondary control valve having a control chamber, a piston reciprocable in said chamber, means operable by said piston to regulate the charging and discharging of the brake cylinder, connections from said container and from said cylinder to said secondary control valve whereby the pressures in said container and cylinder respectively are enabled to act in the same direction on the piston of said secondary control valve in opposition to a pressure in said chamber.

3. In a single chamber compressed air brake as in claim 2, connections from each end of the regulating container to different parts of the casing of the primary control valve, a slide movable in said casing adapted to place one of said connections in communication with the train pipe, said slide being adapted when in another position to place said connection in communication with the atmosphere.

4. In a single chamber compressed air brake as in claim 2, connections from each end of the regulating container to different parts of the casing of the primary control valve, a slide movable in said casing adapted to place one of said connections in communication with the train pipe, said slide being adapted when in another position to place said connection in communication with the atmosphere, and a piston movable in said container to divide same into two chambers of relatively variable capacity.

5. In a single chamber compressed air brake, a train pipe, a brake cylinder, a regulating container, a primary control valve having an easily moving piston highly sensitive to pressure variations, said primary control valve being directly connected with said pipe, connections from primary control valve to said container adapted to effect the filling and exhaustion of said container in accordance with the movements of said piston, a secondary control valve having a control chamber, a differential piston device comprising a larger piston reciprocable in said chamber and adapted to regulate the charging and discharging of the brake cylinder, said larger piston being exposed to the pressure in said chamber and also to the pressure in said container, and a smaller piston exposed on the side remote from said chamber to the brake cylinder pressure.

6. In a single chamber compressed air brake, a train pipe, a brake cylinder, a regulating container, a primary control valve having an easily moving piston highly sensitive to pressure variations, said primary control valve being directly connected with said pipe, connections from said primary control valve to said container adapted to effect the filling and exhaustion of said container in accordance with the movements of said piston, a secondary control valve having a control chamber, a differential piston device comprising a larger piston reciprocable in said chamber and having a slide adapted to regulate the charging and discharging of the brake cylinder, said larger piston being exposed to the pressure in said chamber and also to the pressure in said container, and a smaller piston exposed on the side remote from said chamber to the brake cylinder pressure, the slide of said secondary control valve being adapted to open to atmospheric pressure the said remote side of said smaller piston.

7. A single chamber compressed air brake as in claim 5, wherein the differential piston device of the secondary control valve is divided into two portions.

8. In a single chamber compressed air brake as in claim 1, a hollow slide in the secondary control valve movable with the piston thereof, a pipe from the brake cylinder opening under said slide, another pipe having one end opening under said slide and its other end opening under a hollow slide in the primary control valve, the piston of which latter valve is adapted to place the hollow of its slide in communication with the atmosphere, whereby the exhaustion of the brake cylinder can be effected by the co-operation of the primary and secondary control valve pistons.

9. In a single chamber compressed air brake as in claim 1, connections between the brake cylinder and the primary control valve, and a slide in said valve adapted to open said connections when in the braking position, whereby said cylinder can be placed in communication with the container across said primary control valve.

10. In a single chamber compressed air brake as in claim 1, connections having a throttled passage between the brake cylinder and the primary control valve, and a slide in said valve adapted to open said connections when in the braking position, whereby said cylinder can be placed in communication with the container across said primary control valve.

11. A single chamber compressed air brake as in claim 1, wherein the usual auxiliary reservoir is combined with the regulating container as one compressed air vessel in communication with both the primary and secondary control valves.

12. In a single chamber compressed air brake as in claim 1, a valve provided with a by-pass in the connection between the regulating container and the control chamber of the secondary control valve.

13. In a single chamber compressed air brake as in claim 1, a connection between the brake cylinder and the primary control valve, a slide in said valve adapted to open said connection when in the braking position, and a check valve arranged in the said connection.

WILHELM HILDEBRAND.